INVENTOR.
PAUL E. APPLEBY

Aug. 25, 1953  P. E. APPLEBY  2,649,892
TIRE BEAD STITCHING MECHANISM
Filed March 17, 1951  4 Sheets-Sheet 2
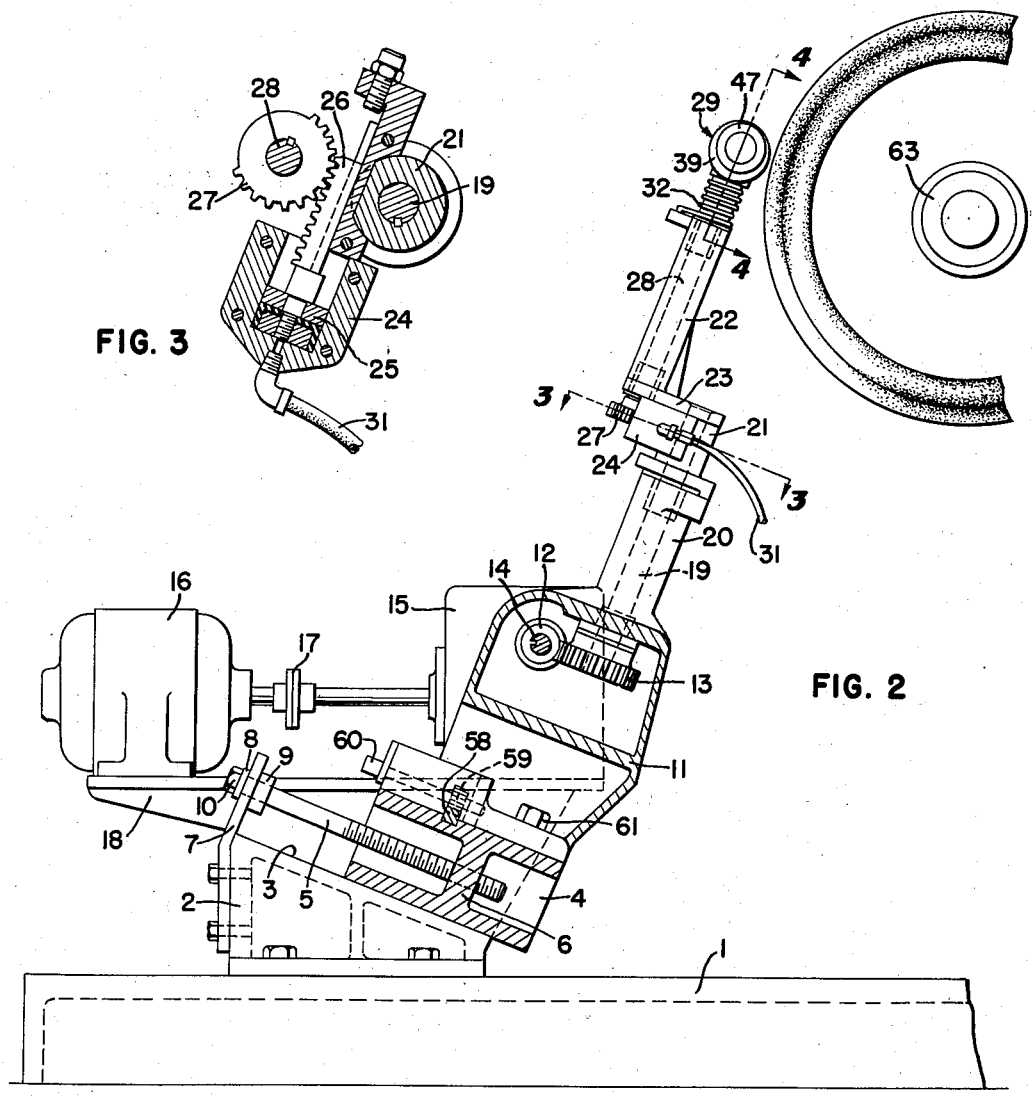
INVENTOR.
PAUL E. APPLEBY
BY
R. L. Miller
ATTORNEY

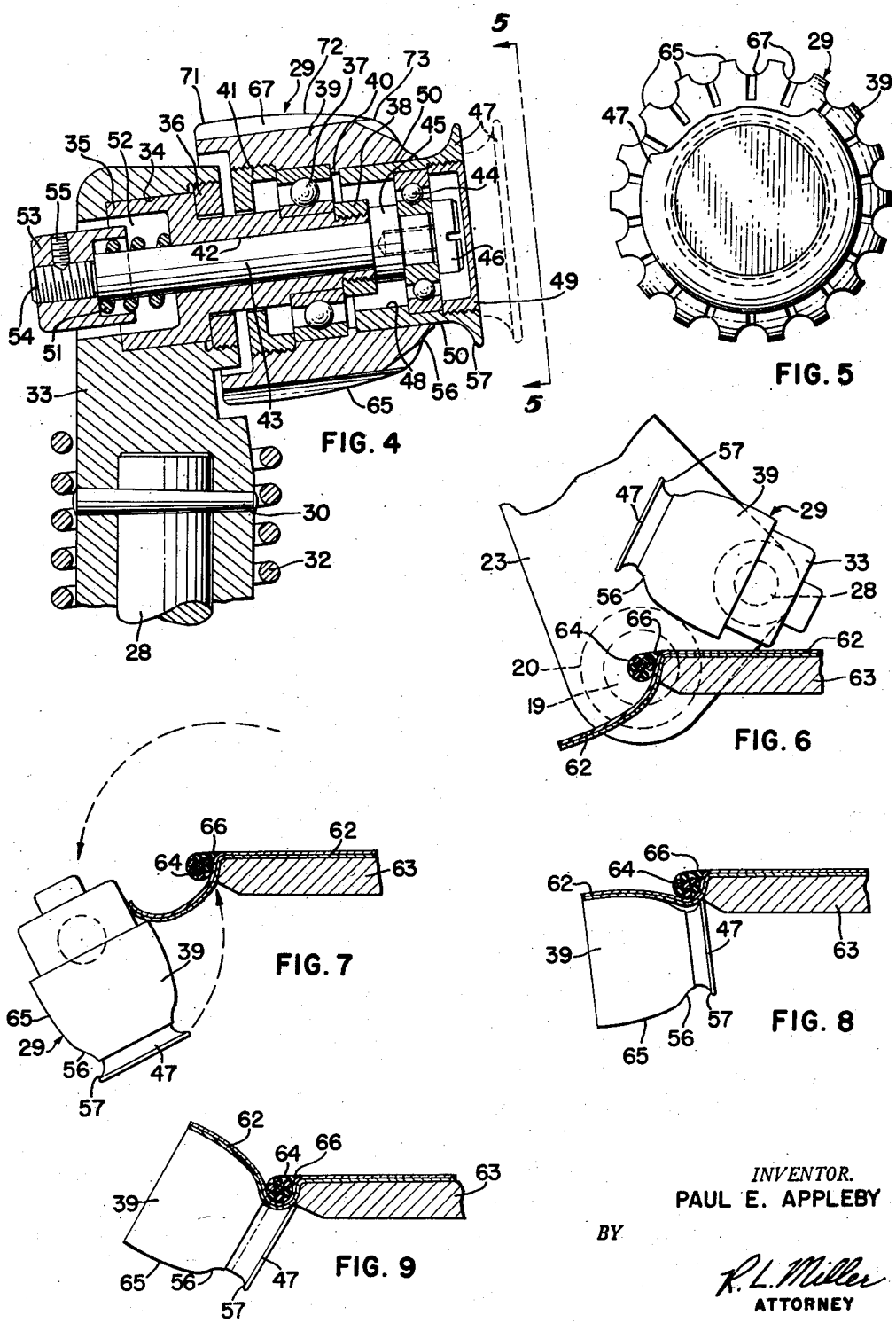

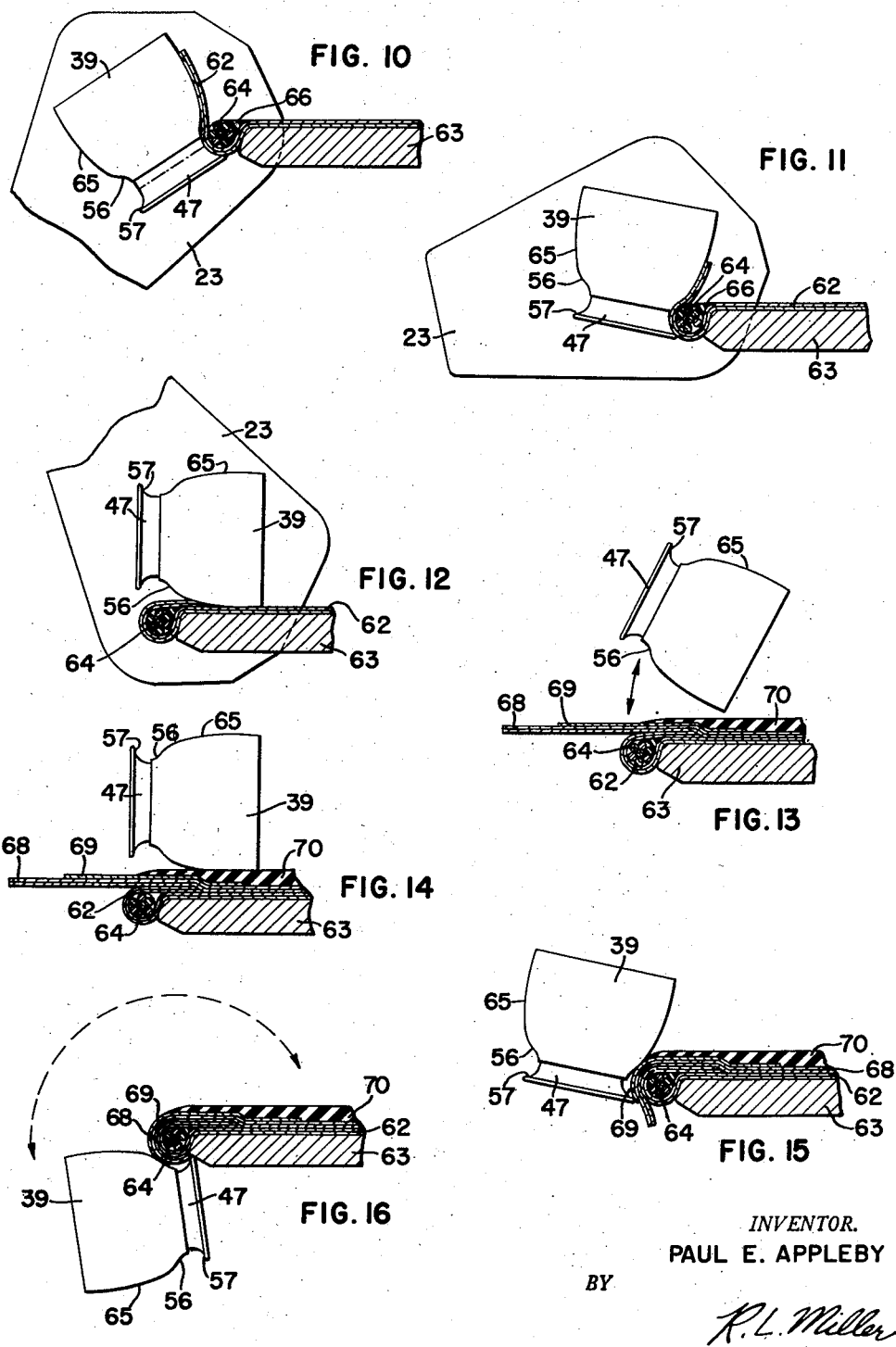

Patented Aug. 25, 1953

2,649,892

UNITED STATES PATENT OFFICE 2,649,892

TIRE BEAD STITCHING MECHANISM

Paul E. Appleby, Akron, Ohio, assignor to Wingfoot Corporation, Akron, Ohio, a corporation of Delaware Application March 17, 1951, Serial No. 216,201

14 Claims. (Cl. 154—10)

This invention relates to pneumatic tire building apparatus of the type which employs a revolving drum upon which the elements of a pneumatic tire having inextensible bead elements incorporated therein are assembled.

In building a tire on a revolving drum, two or more plies of fabric are wound upon the drum. The beads are then applied over the plies at the edges of the drum and the over-hanging edges of the plies are turned up over the beads and rolled and stitched into place. The beads have a wrapping of rubberized fabric, the edges of which are adhesively bonded together, and extend over the first plies of fabric and are rolled and stitched thereto.

After the bead is applied, a second set of fabric plies is placed upon the preceding plies, the edges of same being turned down and rolled and stitched about the bead.

The inextensible beads are very important elements of a tire. They serve to anchor the edges of the several plies of fabric and to retain tires on the rims upon which they are mounted. The fabric tire elements about the beads must be evenly distributed and properly stitched into adhesive relationship. Any looseness of the fabric plies about the bead will cause the bead to shift out of position while subjected to the process of shaping or vulcanizing, causing the tire to be unsafe for use.

Also, if wrinkles in the fabric about the bead are present after vulcanization, the wrinkles will exert pressure on adjacent plies and the frictional contact therewith will weaken the fibers to such an extent that failure of the tire may result when put to use on a vehicle.

An object of the present invention is to provide in each stitching mechanism a plurality of rollers which are formed and mounted so that they may contact certain areas of the bead either singly or together so that at least one of the rollers is in contact with the bead while the stitching mechanism is in operation for turning up the inner plies or turning down the outer plies.

Another object is to provide a mechanism which will stitch and roll the various tire elements about the bead so that the hazards of wrinkles or uneven surfaces are eliminated, with the result that tires will have a better fit on rims and the hazard of blowouts about the bead areas of tires will be greatly reduced.

The aforesaid objects of the invention and other objects which will become apparent as the description proceeds, are achieved by providing a bead stitching mechanism employing means for pivoting the stitching and rolling elements in an orbital arc about the surface of the bead, means for moving said elements into pressure contact with said bead surface, and resilient means for permitting relative movement of the stitcher with respect to the rolling element to provide a differential action that will permit the stitching and rolling members to contact the bead surface at different points simultaneously and will also permit the members to act individually at certain points about the surface of the bead.

For a better understanding of the invention, reference should be had to the accompanying drawings, wherein:

Figure 2 is a side view of the stitcher mechanism;

Figure 3 is a sectional view taken on the line 3—3 of Figure 2;

Figure 4 is an enlarged sectional view taken on the line 4—4 of Figure 2;

Figure 5 is an end view of the stitching and rolling elements as shown in Figure 4, parts being broken away for the sake of clearness;

Figure 6 is a view of the stitching elements in position before the start of the turn up of the first plies;

Figures 7 to 12 show diagrammatically the various positions of the rolling and stitching mechanism in turning up and stitching the first plies into place about the bead; and Figures 13 to 16 show diagrammatically the reverse motion of the stitching and rolling mechanism as it turns down the last or outer plies about the bead.

Figure 1:
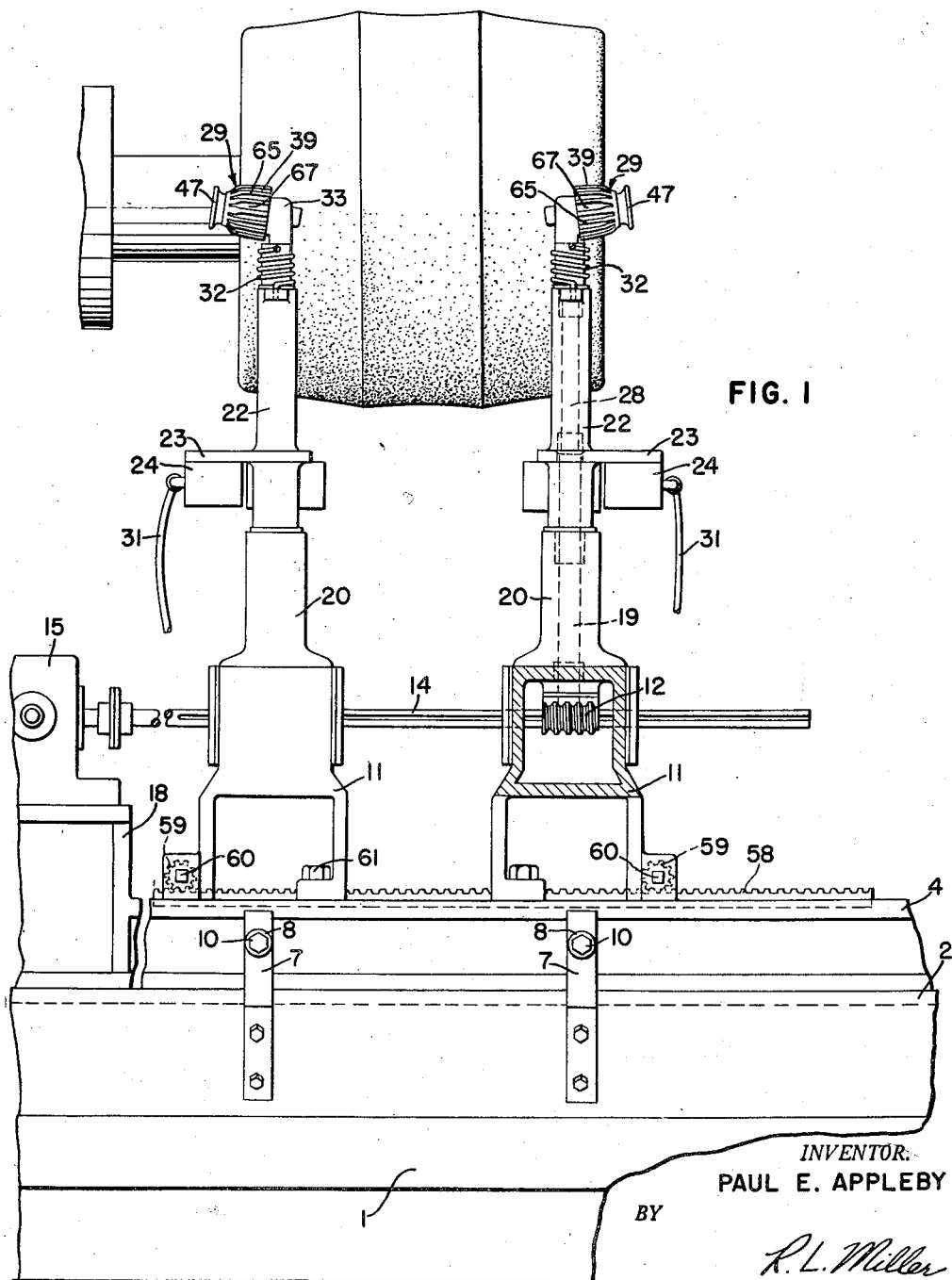
Figure 1 is an elevation of a tire building drum and a fragmentary view of the stitching mechanism, in inoperative position.

Referring now to Figures 1 and 2 of the drawing, wherein one form of apparatus is disclosed as comprising a base 1 upon which is mounted a support 2 having an inclined surface 3 to which is slidably attached a slide 4 which is adjustable along the inclined surface 3 by screws 5 received in the threaded lugs 6, the outer end of the screws being rotatably mounted in brackets 7 and held against longitudinal movement by the collars 8 and 9 and the nuts 10. This adjustable arrangement is for the purpose of adjusting the stitching mechanism in proper relation to the various diameters of drums upon which the tires are built, the slide 4 moving at an angle such as to keep the stitcher moving along a radial line between the stitcher and axis of the drum.

Slidably mounted on the slide 4 are housings 11 in which worms 12 and worm gears 13 are disposed. The worms are mounted on splined shafts 14 (see Fig. 2) extending from a speed reduction unit 15 which is driven by a reversible motor 16 coupled to the speed reduction unit 15 by a coupling 17. The motor and speed reduction unit are mounted on a pedestal 18 formed on one end of the support 2.

The worm gears 13 are supported in the stitcher unit housings on a shaft 19 extending through the extensions 20 of the housings 11 and are keyed in bosses 21 which are offset from the stitcher arms 22 so that when the worms 12 and worm gears 13 are actuated, the stitchers will swing in their respective paths about the bead surfaces of a tire which is being built upon the tire building drum, as will later be described.

The stitcher arms 22 have offset flanges 23 connected to the bosses 21 and to which are attached fluid pressure cylinders 24. Pistons 25 (see Fig. 3) within the cylinders have attached thereto racks 26 which actuate sector gears 27 keyed to shafts 28 which extend upwardly through the stitcher arms 22 to receive on their upper ends stitching and rolling units designated generally by the numeral 29, which are secured on the shaft 28 by pins 30 (see Fig. 4).

When fluid under pressure is admitted to the cylinders 24 through the line 31, the racks 26 revolve the pinion gears 27 which in turn revolve the shaft 28 on which the stitchers are mounted to swing the stitchers and rollers into rolling pressure contact with the tire elements about the bead portions of a tire and these are returned to their normal inoperative neutral position by tortional springs 32 attached to the stitcher body 33 and stitcher arms 22 when the pressure on the cylinders 24 is released.

The rolling and stitching mechanisms 29 are positioned adjacent the edges of the drum, each mechanism comprising a body 33 secured on the shaft 28 by a pin 33, the body being provided with a bore 34 to receive a sleeve 35 secured therein by a nut 36. A turned down portion on said sleeve 35 has a ball-bearing 37 secured thereon by nut 38. Mounted on the ball-bearing is a roller 39 held in alinement by the shouldered portion 40 and a nut 41.

The sleeve 35 (see Fig. 4) is provided with a bore 42 to receive a shaft 43 on which a ball-bearing 44 is mounted and secured thereon between the shouldered portion 45 and the screw 46. Mounted to revolve on the ball-bearing 44 is a stitcher wheel 47 secured thereon between the shouldered portion 48 and the flanged nut 49 which also serves to enclose the outer side of the stitcher wheel. The cylindrical surface 50 of the stitching wheel is telescopically fitted within the forward end of the roller 39 and is permitted to slide outward against the resistance of a compression spring 51 disposed about the rearward end of the shaft 43 which extends into a recess 52 formed in the sleeve 35, said spring being retained on the shaft by a nut 53 screwed onto the reduced threaded end 54 of the shaft 43 and secured thereon by a set screw 55.

The spring 51 permits the stitcher wheel 47 to slide outwardly from the roller 39 so that the curved surface 56 of the roller 39 and the bead contacting surface 57 of the stitcher wheel 47 may work in unison, the spring allowing the stitcher wheel to spread and retract with respect to the concave bead contacting surface 56 of the roller 39 so that they both may traverse certain portions of the bead areas separately or simultaneously in cooperation with one another.

The stitching mechanisms 29 may be shifted laterally toward and away from one another by sliding the housings 11 along the slide 4, said housings being guided by a rack 58 which is engaged by a pinion 59 mounted on a shaft 60. The housings are locked in place by screws 61.

The operation of each stitching unit may be readily understood by now referring to the diagrammatic Figures 5 to 15.

First considering Figures 6 to 12 for the turning up operation of the plies of fabric which are applied under the bead. As shown in Fig. 6 the fabric plies 62 have been placed on the drum 63 and the bead 64 set in place while the stitcher mechanisms 29 are in their normal inoperative position. In the stitching operation, the reversible motor, through the action of the worm 12 and pinion 13, rotates in a direction to swing the stitching mechanism in the direction indicated in Fig. 7 until the stitcher wheel 47 contacts the plies 62 as shown in Fig. 8, whereupon through the action of the fluid pressure cylinder 24 and the rack 26 and pinion 27, pressure is exerted by the stitcher wheel on the fabric plies to start the turn up operation, whereupon the motor is reversed and the stitching mechanisms 29 swing in a reverse path about the bead, causing the concave roller surface 56 to contact the plies of fabric 62 as shown in Fig. 9 where it will be noted that the stitcher wheel 47 causes the spring 51 to compress, thereby permitting the stitcher wheel surface 57 to spread from the curved roller surface 56 so both of these surfaces may follow their natural independent course regardless of any variations or irregularities in the bead contour. This spreading continues in a greater or less degree as illustrated in Figs. 9 and 10 but when the stitcher and roller have reached the position as in Fig. 11, the stitcher wheel has receded and the curved surface 65 of the roller 39 finishes the remainder of the work of rolling down the bead fabric 66 and to roll the ends of the plies 62 around the bead and against the main body of the first plies 62 as shown in Fig. 12. The convex surface 65 must be of the proper radius to conform to the arc through which the roller moves in order to roll down the tire elements adjacent the bead as illustrated in Figs. 12 and 14. Note that the axis of rotation of shaft 19 is substantially at or near the bead of the tire so that the stitcher swings in an arc about the tire bead. This insures that the pressure cylinder 24 exerts a uniform action on the stitcher as the stitcher moves about the axis of shaft 19.

The curved surfaces of the rollers 39 are provided with flutes or grooves 67 so that they provide a stepping down action which will prevent shifting of the plies and prevent wrinkles or other distortion of the tire elements when being turned about the bead and surface adjacent thereof. The flutes are of varying width which are proportionate to the varying diameters of the contoured surface of the rollers in which they are formed.

When the stitching mechanism has reached the position as shown in Fig. 12, the pressure in the cylinder is released and through the action of the tortional spring 32 the stitcher 47 and roller 39 take the position as shown in Fig. 13 ready for the turning down and stitching of the outer plies 68. In this position the outer plies 68, chafing strips 69, and tread 70 are placed on the drum 63 over the preceding plies 62. The motor is reversed and through the reverse action of the worm 12 and pinion 13 the roller 39 and stitcher 47 are swung in a reverse path as indicated in Figs. 13, 14, 15 and 16. In this turning down cycle, the outer plies 68 about the bead are first contacted by the stitcher wheel which stitches the fabric around the bead surface and the roller 39 follows to roll down the edges of the tread and the fabric adjacent the bead and also rolls down the plies about the bead to assist the stitcher in providing a smooth even compact surface about the bead.

The outer surface of the rollers 39 are contoured in an axial direction, the larger end portion 71 being cylindrical which merges with a substantially conical portion 72 which tapers toward the axis and merges with a convex portion 73 which, in turn, merges with the concave portion 56. These variations in the outer contour of the rollers are important and upon the accuracy of same depends the degree of perfection with which the tire elements are rolled and stitched about the changing contours of the bead and surfaces adjacent thereto. There must be perfect coordination between the varying contour of rollers 39 and the pivoting mechanism to assure the desired degree of perfection in stitching the tire elements about the bead.

From the foregoing it will be evident that in this invention a novel stitching mechanism has been devised wherein rollers provided with the proper determined contours cooperate with stitching wheels to secure the tire elements about certain areas of the bead while working simultaneously and about other areas of the bead by individual action.

While certain representative embodiments and details have been shown for the purpose of illustrating the invention, it will be apparent to those skilled in this art that certain modifications and changes may be made therein without departing from the spirit or scope of the invention.

I claim:

1. In a tire building machine of the type employing a revolvable drum upon which the various elements of a pneumatic tire having inextensible bead portions incorporated therein are assembled; a bead stitching mechanism for turning and stitching the various fabric plies about the bead, comprising a stitcher wheel and a cooperating roller, said stitcher wheel being slidable axially of said roller, means for mounting said wheel and roller for movement in an arc about the bead, means for exerting yielding pressure on said mounting means to move the wheel and roller on the ply elements about the bead and resilient means to permit independent movement of said wheel axially of said roller.

2. In a tire building machine of the type employing a revolvable drum upon which the elements of a pneumatic tire having inextensible bead portions incorporated therein are assembled; a bead stitching mechanism for turning and stitching the various fabric elements about the bead; means for pivoting the mechanism about the bead at various angles thereto; pressure means for moving the stitching mechanism into contact with the bead; said stitching mechanism comprising a stitcher wheel and a roller having substantially continuous concave surfaces axially thereof for engagement with the bead, said stitcher being mounted for sliding and rotative movement in said roller, resilient means for urging the stitcher wheel axially in one direction and permitting axial movement with respect to the roller in the opposed direction and said roller having a convex surface adjacent its concave surface to engage and roll down the tire elements adjacent the bead.

3. In a tire building machine of the type employing a revolvable drum upon which the various elements of a pneumatic tire having inextensible bead portions incorporated therein are assembled; a bead stitching mechanism for turning and stitching the various fabric elements about the bead and surfaces adjacent thereto; means for swinging said mechanism about the bead at various angles thereto; means for positioning the rolling and stitching mechanism into operative rolling pressure contact with the bead; said stitching mechanism comprising a stitcher wheel and a roller having a curved contour axially thereof, said stitcher wheel and roller having contiguous concave surfaces axially thereof to form a groove to embrace the bead in rolling contact therewith, resilient means to permit movement of the stitcher wheel axially with respect to said roller to permit independent contact of the stitcher wheel and roller due to the changing contour of the bead, said roller having a curved surface to roll down the tire elements adjacent the bead and means to return the roller and stitcher out of contact with the bead.

4. In a pneumatic tire building machine of the type employing a revolvable drum upon which the various elements of a tire having inextensible bead elements incorporated therein are assembled; at least one bead stitching mechanism for turning and stitching the various tire elements about the bead comprising an arm, a roller having axially curved surfaces mounted on said arm, a stitcher wheel mounted telescopically in said roller, resilient means for providing axial movement of said stitcher with respect to said roller, reversible means for pivoting said roller and stitcher wheel in an arc about the bead surface in either direction, pressure means for engaging the roller and stitcher wheel with the tire elements about the bead and resilient means for disengagement of the roller and stitcher wheel from said bead.

5. A bead stitching mechanism for turning and stitching the various elements of a pneumatic tire about the bead and tire surfaces adjacent thereto, said mechanism comprising at least one rolling member disposed on said arm, a stitcher disk slidably and rotatably mounted in said roller, means for pivoting the rolling and stitching member in an orbital arc about the bead surfaces, means for yieldingly engaging the roller and stitching means with the bead surfaces, resilient means for disengaging the roller and stitcher from said bead and reversing means to swing the rolling and stitching members to a neutral position.

6. A bead stitching mechanism for turning and stitching the elements of a tire about the bead portion thereof comprising at least one housing, an arm pivotally mounted on said housing, means for pivoting said arm, a substantially cylindrical roller mounted on said arm, a stitcher wheel telescopically mounted in said cylindrical roller, said cylindrical roller being provided at one end with a concave surface to embrace the bead portion of a tire to roll the tire plies thereon and a convex surface to roll down the tire elements adjacent the bead portion, said stitcher wheel operating with said cylindrical roller to stitch the tire elements to the bead portion and resilient means to disengage the roller and stitcher from the bead.

7. In a tire building machine of the type which employs a revolvable drum upon which the elements of a pneumatic tire having inextensible bead portions incorporated therein are assembled; a bead stitching mechanism including a roller, the outer surface of which has a contour in an axial direction which is cylindrical at one portion, which portion merges with a substantially conical portion tapering toward the axis, said conical portion merging successively with a convex portion and a concave portion, each of said portions being proportioned so that at least one of them will be in continuous contact with the bead or tire elements adjacent thereto during the stitching operation.

8. In a tire building machine of the type employing a revolvable drum upon which the various elements of a pneumatic tire having inextensible bead portions incorporated therein are assembled; a bead stitching mechanism for turning and stitching the various fabric plies about the bead and surfaces adjacent thereto, said stitching mechanism being composed of a stitcher wheel and a cooperating roller, means for positioning said wheel and roller in an arc about the bead, fluid pressure means for exerting yielding pressure of the wheel and roller on the ply elements about the bead and resilient means to permit contact of the wheel and roller about the surface of the bead.

9. In a tire building machine of the type employing a revolvable drum upon which the elements of a pneumatic tire having inextensible bead portions incorporated therein are assembled; a bead stitching mechanism for turning and stitching the various fabric elements about the bead; means for pivoting the mechanism about the bead at various angles thereto; pressure means for moving the stitching mechanism into contact with the bead; said stitching mechanism comprising a stitcher wheel and a roller having substantially continuous concave surfaces axially thereof for engagement with the bead, said stitcher being mounted for sliding and rotative movement in said roller, resilient means for urging the stitcher wheel axially in one direction and permitting axial movement with respect to the roller in the opposed direction and said roller having a convex surface adjacent its concave surface coordinated with the pivoting mechanism to engage and roll down the tire elements adjacent the bead.

10. In a tire building machine of the type employing a revolvable drum upon which the various elements of a pneumatic tire having inextensible bead portions incorporated therein are assembled; a bead stitching mechanism for turning and stitching the various fabric elements about the bead and surfaces adjacent thereto; means for pivoting said mechanism about the bead at various angles thereto; means for positioning the rolling and stitching mechanism into operative rolling pressure contact with the bead; said stitching mechanism comprising a stitcher wheel and a roller having a curved contour axially thereof, said stitcher wheel and roller having contiguous concave surfaces axially thereof to form a groove to embrace the bead in rolling contact therewith, resilient means to permit movement of the stitcher wheel axially with respect to said roller to permit independent contact of the stitcher wheel and roller due to the changing contour of the bead, said roller having a curved surface coordinated with said pivoting means to roll down the tire elements adjacent the bead and means to return the roller and stitcher out of contact with the bead.

11. In a pneumatic tire building machine of the type employing a revolvable drum upon which the various elements of a tire having inextensible bead elements incorporated therein are assembled; at least one bead stitching mechanism for turning and stitching the various tire elements about the bead comprising an arm, a roller having axially curved surfaces mounted on said arm; a stitcher wheel mounted telescopically in said roller, resilient means for providing relative axial movement of said stitcher with respect to said roller, a reversible means for pivoting said roller and stitcher wheel in an arc about the bead surface in either direction, pressure means for engaging the roller and stitcher wheel with the tire elements about the bead and resilient means for returning the roller and stitcher to a normal inoperative position.

12. A bead stitching mechanism for turning and stitching the elements of a tire about the bead portion thereof comprising at least one housing, an arm pivotally mounted on said housing, pivoting means for said arm, a substantially cylindrical roller mounted on said arm, a stitcher wheel telescopically mounted in said cylindrical roller, said cylindrical roller being provided with a concave surface to embrace the bead portion of a tire to roll the tire plies thereon and a convex surface to roll down the tire elements adjacent the bead portion, said stitcher wheel operating with said cylindrical roller in coordination with the pivoting means to stitch the tire elements to the bead portion and resilient means to disengage the roller and stitcher from the bead.

13. In a tire building machine of the type which employs a revolving drum upon which the elements of a pneumatic tire having inextensible bead portions incorporated therein are assembled; a bead stitching mechanism including a roller, means for pivoting said roller about the bead, the outer surface of said roller having a contour in an axial direction which is cylindrical at one portion, which portion merges with a substantially conical portion tapering toward the axis, said conical portion merging successively with a convex portion and a concave portion, each of said portions being proportioned to coordinate with the pivoting means so that at least one of said portions will be in continuous contact with the bead and tire elements adjacent thereto during the rolling operation.

14. In a tire building machine of the type which employs a revolvable drum upon which the various elements of a pneumatic tire having inextensible bead portions incorporated therein are assembled, a stitching mechanism for rolling and stitching the various tire elements about the bead, comprising a stitching member, said stitching member being pivotally mounted for movement about the bead at various angles thereto, means for pressure engagement of the stitching member with the tire elements about the bead; said stitching member being composed of a stitching wheel and a contoured roller, means for mounting said roller and wheel to provide permissible relative movement of the stitching surfaces and means for resiliently urging said surfaces toward each other while permitting movement away from each other to permit simultaneous pressure of their surfaces over certain areas and independent pressure of their surfaces over other areas of the bead and surfaces adjacent thereto.

PAUL E. APPLEBY.

References Cited in the file of this patent

UNITED STATES PATENTS

| Number | Name | Date |
|---|---|---|
| 2,381,379 | Stevens | Aug. 7, 1945 |
| 2,394,318 | McChesney | Feb. 5, 1946 |
| 2,541,648 | Haase | Feb. 13, 1951 |